United States Patent [19]
Lermann

[11] 3,921,186
[45] Nov. 18, 1975

[54] PHOTOGRAPHIC CAMERA WITH SIMPLIFIED DIAPHRAGM OPENING MECHANISM

[75] Inventor: Peter Lermann, Narring, Germany

[73] Assignee: AGFA-Gevaert AG, Leverkusen, Germany

[22] Filed: June 12, 1974

[21] Appl. No.: 478,821

[30] Foreign Application Priority Data
June 22, 1973 Germany.......................... 2331857

[52] U.S. Cl. ..................... 354/43; 354/59; 354/271
[51] Int. Cl.² ........................ G03B 7/08; G03B 9/02
[58] Field of Search ............ 354/26, 29, 30, 40, 42, 354/43, 48, 49, 50, 51, 59, 60, 270, 271

[56] References Cited
UNITED STATES PATENTS
3,589,251  6/1971  Webb................................. 354/50
3,709,137  1/1973  Starp................................. 354/60 X
3,820,131  6/1974  Tanaka............................. 354/271 X

*Primary Examiner*—Joseph F. Peters, Jr.
*Attorney, Agent, or Firm*—Michael S. Striker

[57] ABSTRACT

A spring turns a diaphragm leaf so as to admit increasing amounts of light to the film. The action of the spring is opposed by a retard mechanism. When sufficient light falls on a light-sensitive element mounted behind the opening of the diaphragm, an electromagnet is energized. The armature which is stopped by energization of the electromagnet also constitutes the mass of the retard mechanism. Specifically, it is coupled to the pallet of the retard mechanism which in turn interacts with the escapement wheel to oppose the spring-driven opening motion of the diaphragm.

5 Claims, 1 Drawing Figure

U.S. Patent   Nov. 18, 1975   3,921,186
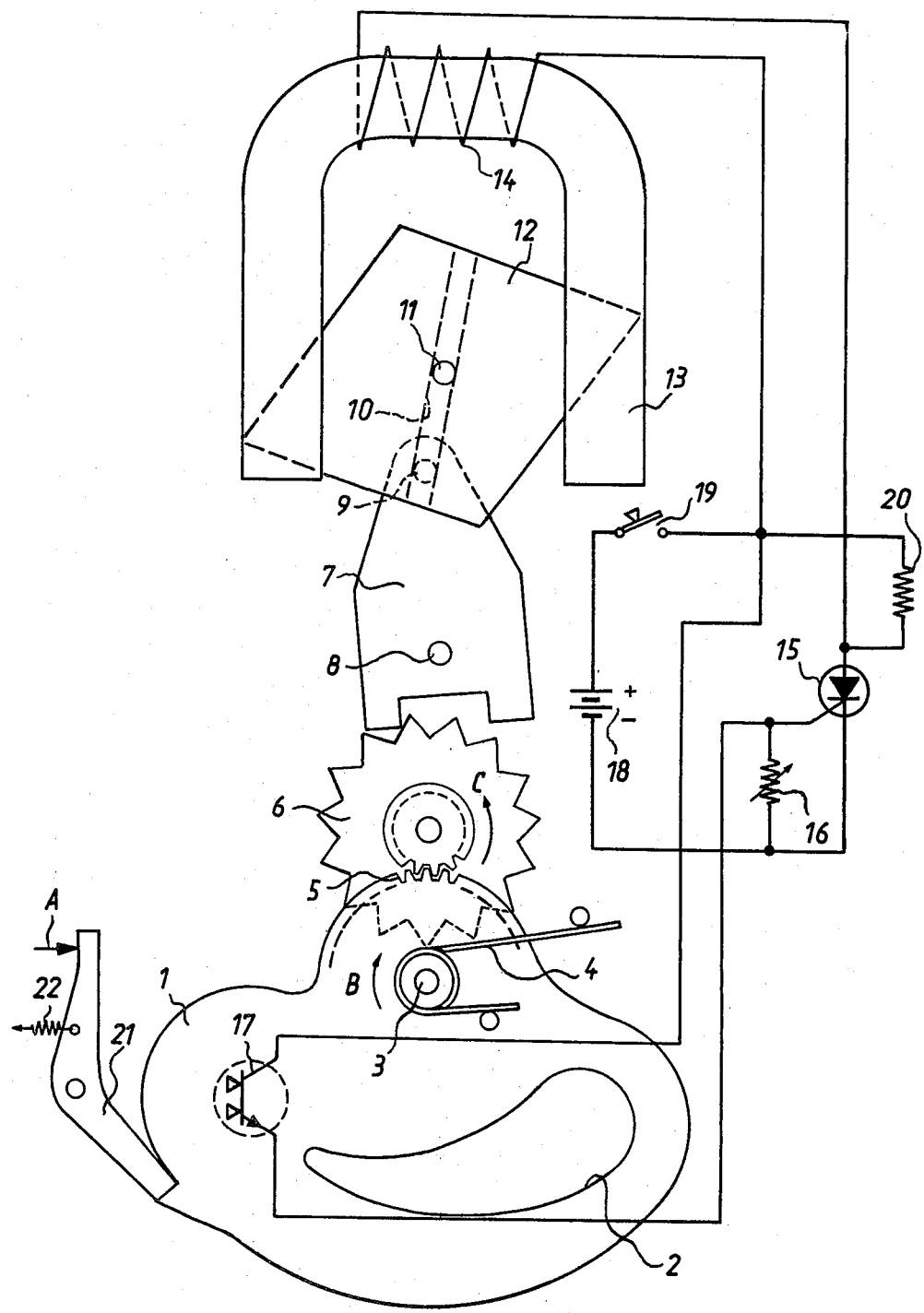

3,921,186

PHOTOGRAPHIC CAMERA WITH SIMPLIFIED DIAPHRAGM OPENING MECHANISM

BACKGROUND OF THE INVENTION:

The present invention resides in photographic cameras ans specifically in photographic cameras having automatic diaphragm control means. The automatic diaphragm control means comprise a spring which causes the opening of the diaphragm and a retard mechanism which opposes this motion. It further comprises a light-sensitive element positioned behind the diaphragm opening in the direction of light travelling to the film. The voltage across the light-sensitive element is utilized to control the energization of an electromagnet. Following energization of the electromagnet, the opening of the diaphragm is stopped.

SUMMARY OF THE INVENTION

It is an object of the present invention to furnish a photographic camera of the above-described type in which the diaphragm control apparatus is of a particularly simple and economical construction.

The present invention resides in a photographic camera having a diaphragm and a retard mechanism for opposing the motion of said diaphragm during opening of said diaphragm. The camera further has photoelectric circuit means responsive to the light passing through said diaphragm for furnishing a stop signal when said light has reached a predetermined light quantity. The camera further has an electromagnet energized in response to said stop signal. The invention comprises an armature for said electromagnet which is mechanically coupled to said retard mechanism to form a part thereof and mounted relative to said electromagnet in such a manner that energization of said electromagnet stops the motion of said armature, thereby stopping the opening of said diaphragm. Thus after the energization of the electromagnet the motion of the retard mechanism is stopped. Since stopping of the retard mechanism also stops the motion of the diaphragm, the diaphragm will then be opened to an opening admitting the required quantity of light to the film.

It is a further advantage of the present invention that the mechanical wear during stopping of the diaphragm is minimized.

In a preferred embodiment of the present invention the armature constitutes the mass for the retard mechanism. The mass is mechanically coupled to the pallet of the retard mechanism which in turn interacts with the escapement wheel in opposing the motion of the diaphragm. This type of arrangement minimizes the power which must be generated in the electromagnet for stopping the motion of the diaphragm. This in turn gives the further advantage that small electromagnets may be used.

In a preferred embodiment of the present invention the electromagnet is arranged in the anode-cathode circuit of a thyristor whose gate is connected with a light-sensitive element. In a preferred embodiment of the present invention, the light-sensitive element is a phototransistor which is arranged behind the trumpet-shaped opening in the diaphragm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE is a schematic diagram of the diaphragm control arrangement of the present invention.

DESCRIPTION OF THE PREFERRED EMBODIMENT

A preferred embodiment of the invention will now be described with reference to the drawing.

In the FIGURE, reference numeral 1 denotes a diaphragm element which has a trumpet-shaped opening 2. The diaphragm element is rotatable about an axis 3 and is driven by a spring 4. Reference numeral 5 denotes gear teeth of diaphragm element 1. The gear teeth of an escapement wheel 6 mesh with the above-mentioned gear teeth 5. A pallet 7 cooperates with escapement wheel 6 and is adapted to oscillate about an axis 8. Pallet 7 has a pin 9 which is engaged in a groove 10 of a mass 12. Mass 12 is mounted for oscillation about axis 11. Further, the mass 12 is made of magnetically conductive material and is mounted directly underneath a magnetic core 13. A coil 14 is wound around magnetic core 13. Magnetic core 13 and coil 14 together constitute an electromagnet. Coil 14 further is connected in series with the anode-cathode circuit of a thyristor 15 whose gate is connected to the tap of a voltage divider comprising a phototransistor 17 and an adjustable resistor 16. Phototransistor 17 is mounted behind diaphragm element 1.

A battery 18 may be connected to energize the thyristor-coil circuit as well as the voltage divider through a switch 19. A resistor 20 is connected in parallel with coil 14.

A diaphragm release lever 21 moves under the action of a spring 22.

The above-described arrangement operates as follows: If a lever 21 is moved in the direction of arrow A, shutter element 1 rotates in the direction of arrow B under action of spring 4. The rotation of the shutter element is evenly retarded by a retard mechanism having elements 6, 7 and 12. Escapement wheel 6 of the retard mechanism moves in the direction of an arrow C, while pallet 7 as well as mass 12 oscillate about their respective axes 8 and 11.

At first no light falls on phototransistor 17. However, the trumpet-shaped opening 2 finally advances into the region of phototransistor 17. However, at first, the voltage across resistor 16 is insufficient to fire thyristor 15.

As the diaphragm element 1 continues to rotate, increasing amounts of light fall on phototransistor 17. Thus the voltage at the gate of thyristor 15 increases until finally its threshold voltage is passed. When the threshold voltage has passed, thyristor 15 becomes conductive and electromagnet 13, 14 is energized. The magnetic field generated by magnetic core 13 causes the motion of mass 12 to be inhibited. Stopping of the oscillatory motion of mass 12 results in a stoppage of the retard mechanism including pallet 7 and escapement wheel 6. The fact that the escapement wheel no longer rotates of course causes the motion of the diaphragm element to be stopped also.

It should be noted that for the present invention other types of diaphragm elements such as diaphragm rings having a series of circular openings with continuously increasing diameters may also be used. The only requirement is that the light falling on the phototransistor increases as the diaphragm opening increases.

Further of course other threshold circuits can be substituted for thyristor 15 and other light-sensitive elements for phototransistor 17.

While the invention has been illustrated and described as embodied in specific diaphragms, retard mechanism and light-sensitive control circuits it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a photographic camera having a diaphragm and photoelectric circuit means responsive to light passing through said diaphragm for furnishing a stop signal when said light is a predetermined light quantity, the improvement, comprising, in combination, opening means coupled to said diaphragm for opening said diaphragm; a retard mechanism for opposing the motion of said diaphragm during the opening thereof; and an electromagnet energized in response to said stop signal and having an armature mechanically coupled to said retard mechanism to form a part thereof in such a manner that the motion of said retard mechanism is stopped upon stopping of the motion of said armature, said armature being mounted relative to said electromagnet in such a manner that energization of said electromagnet stops said motion of said armature and thereby of said retard mechanism, whereby said opening of said diaphragm is stopped when the light passing through said diaphragm is said predetermined light quantity.

2. A photographic camera as set forth in claim 1, wherein said diaphragm has a trumpet-shaped opening.

3. A photographic camera as set forth in claim 1, wherein said photoelectric circuit means comprise light sensitive circuit means for furnishing a voltage varying as a function of light falling thereon; and threshold circuit means connected to said light sensitive circuit means and said electromagnet in such a manner that said electromagnet is energized only when said voltage has reached a predetermined voltage.

4. A photographic camera as set forth in claim 3, wherein said threshold circuit means comprise a thyristor having an anode-cathode circuit connected in series with said electromagnet, and a gate connected to said light sensitive circuit means.

5. In a photographic camera having a diaphragm, photoelectric circuit means responsive to light passing through said diaphragm for furnishing a stop signal when said light is a predetermined light quantity, and an electromagnet energized in response to said stop signal, the improvement comprising a retard mechanism for opposing the motion of said diaphragm during opening of said diaphragm, said retard mechanism having an escapement wheel and a pallet mechanically mounted for cooperation with said escapement wheel; and an armature for said electromagnet mechanically coupled to said pallet to constitute the mass for said retard mechanism and mounted relative to said electromagnet in such a manner that energization of said electromagnet stops the motion of said armature, thereby stopping said retard mechanism, whereby said opening of said diaphragm is stopped when the light passing through said diaphragm is said predetermined light quantity.

* * * * *